(12) United States Patent  (10) Patent No.: US 8,685,238 B2
Gunter  (45) Date of Patent: Apr. 1, 2014

(54) POINT-OF-USE SOLAR POWERED WATER DISINFECTION DEVICE AND ASSOCIATED CUSTOM WATER STORAGE CONTAINER

(76) Inventor: Andrew Gunter, Charlotte, NC (US)

( * ) Notice: Subject to any disclaimer, the term of this patent is extended or adjusted under 35 U.S.C. 154(b) by 894 days.

(21) Appl. No.: 12/641,854

(22) Filed: Dec. 18, 2009

(65) Prior Publication Data

US 2010/0155339 A1    Jun. 24, 2010

Related U.S. Application Data

(60) Provisional application No. 61/138,808, filed on Dec. 18, 2008.

(51) Int. Cl.
*C02F 1/32* (2006.01)

(52) U.S. Cl.
USPC ... 210/153; 210/748.01; 210/141; 210/198.1; 210/85; 210/348; 422/22; 422/24; 422/186; 422/186.3; 250/432 R; 250/431; 250/435; 250/428; 250/455.11

(58) Field of Classification Search
USPC ........ 210/739, 198.1, 205, 295, 141, 139, 85, 210/348, 748.01; 422/22, 24, 186, 186.3; 250/432 R, 431, 435, 436, 428, 455.11
See application file for complete search history.

(56) References Cited

U.S. PATENT DOCUMENTS

| | | |
|---|---|---|
| 4,535,247 A | 8/1985 | Kurtz |
| 5,106,495 A | 4/1992 | Hughes |
| 5,503,800 A | 4/1996 | Free |
| 5,628,895 A | 5/1997 | Zucholl |
| 6,129,893 A | 10/2000 | Bolton et al. |
| 6,193,894 B1 | 2/2001 | Hollander |
| 6,565,803 B1 | 5/2003 | Bolton et al. |
| 6,570,173 B1 | 5/2003 | Kunkel et al. |
| 6,614,039 B2 | 9/2003 | Hollander |
| 7,081,225 B1 | 7/2006 | Hollander |
| 2004/0108280 A1* | 6/2004 | Saraceno ................. 210/748 |
| 2007/0272877 A1 | 11/2007 | Tribelsky et al. |
| 2008/0203007 A1* | 8/2008 | Jang et al. ................ 210/348 |

FOREIGN PATENT DOCUMENTS

WO    WO 2006043283 A1 *  4/2006
WO    WO 2007136831 A2 *  11/2007

* cited by examiner

*Primary Examiner* — Joseph Drodge
*Assistant Examiner* — Cameron J Allen
(74) *Attorney, Agent, or Firm* — Moore & Van Allen, PLLC; Jeffrey R. Gray

(57) ABSTRACT

Embodiments of the invention relate to systems and methods for a solar and/or AC current powered water disinfection system that is sized for portable use and is specifically tailored for use in under-developed areas of the world or in areas where natural disasters have occurred. Embodiments herein disclosed provide for a system that utilizes an ultraviolet light that is operatively coupled to a pump, inverter, battery, and a charge converter that is adapted for use with a solar panel or AC current. The system is placed into a storage container, or the like, and the water in the storage container is pumped through the ultraviolet light, which kills most waterborne, water-washed, and water-based diseases.

38 Claims, 9 Drawing Sheets

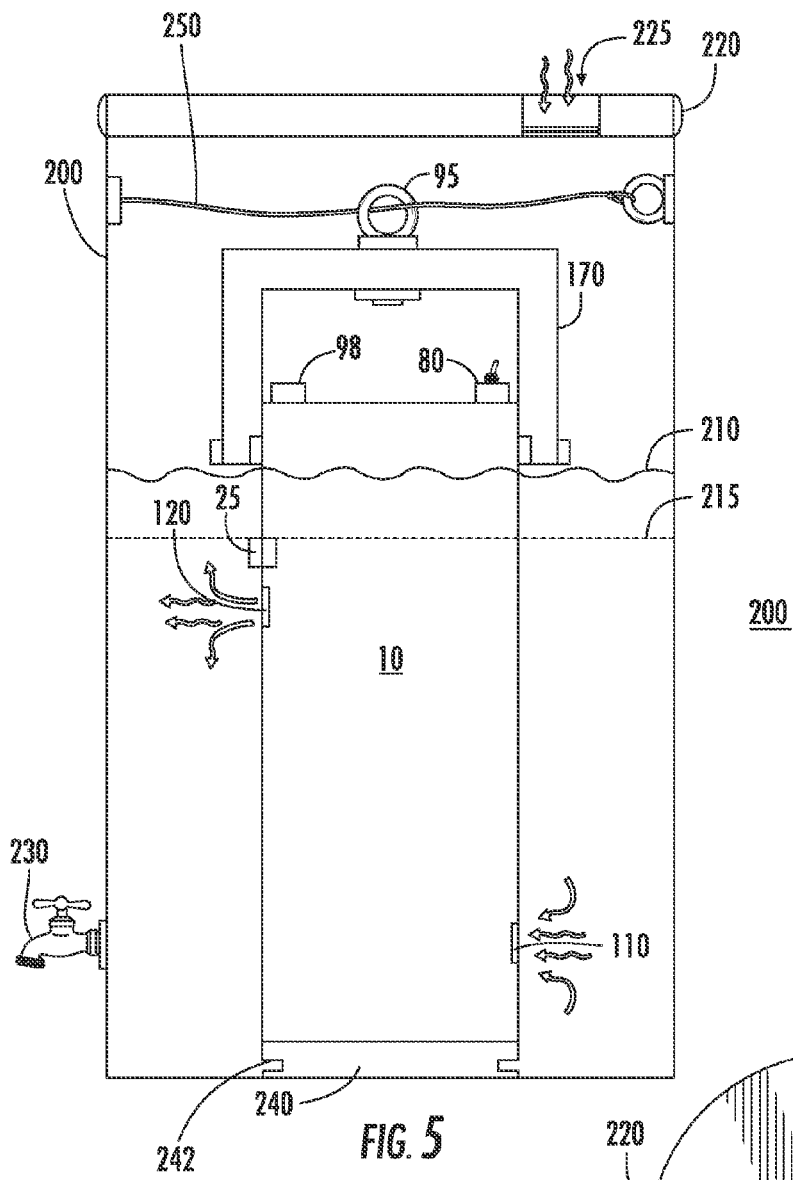
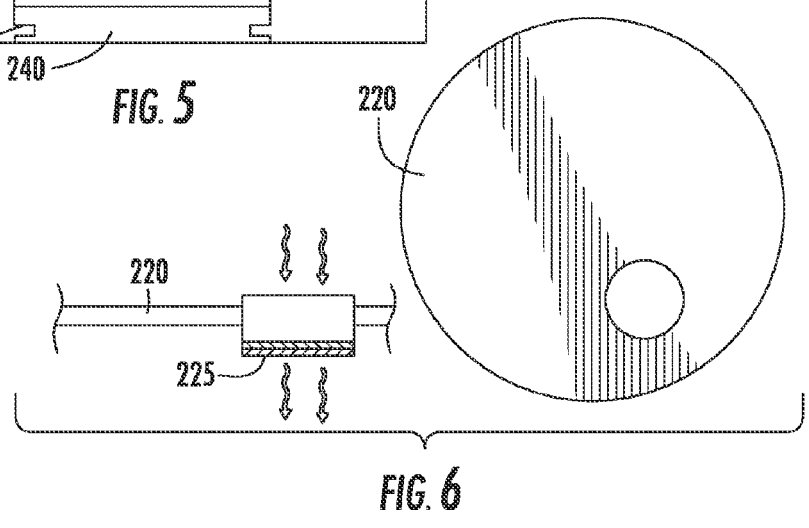

POINT-OF-USE SOLAR POWERED WATER DISINFECTION DEVICE AND ASSOCIATED CUSTOM WATER STORAGE CONTAINER

CLAIM OF PRIORITY UNDER 35 U.S.C. §119

The present Application for a patent claims priority to Provisional Application No. 61/138,808 entitled "Solar Powered Water Disinfection Device and Carrier" filed Dec. 18, 2008, and assigned to the assignees hereof and hereby expressly incorporated by reference herein.

FIELD

The present invention relates generally to water disinfection and, more particularly, a water disinfection system that uses either solar energy or AC current for power and is sized for portable use, specifically in under-developed areas of the world.

BACKGROUND

According to the World Health Organization ("WHO") and the United Nations Children's Fund ("UNICEF"), diarrheal diseases cause 12 percent of deaths in children under the age of 5, worldwide. The leading contributor to diarrheal diseases is drinking water contamination. Over 1 billion people have no access to clean water sources and as many as 2.5 billion have no basic sanitation. The WHO estimates that gastroenteritis, which is a diarrheal disease of the intestinal tract, causes 5 to 10 billion cases of disease and 3 to 5 million deaths annually worldwide, 2 million of which are children. Bacteria, viruses, and parasites are frequent pathogens that cause diarrheal diseases and are able to infect large populations through the contamination of drinking water. Additionally, many of the life cycles of these organisms require the individual to ingest the water, not only to infect the individual, but to also spread the disease.

According to some, a leading cause of infection from these pathogens is from secondary contamination of water at the point-of-use (e.g. the home). Some people in the industry believe that household based disinfection systems are twice as effective for preventing diarrheal diseases as source based disinfection systems, due to the increased likelihood that the source based treated water can become contaminated during transport back to the point-of-use or due to unsanitary use after transport.

Ultraviolet ("UV") light is currently used in a number of commercial, medical, and home applications for disinfecting surfaces, clothing, liquids, etc. Specifically, water disinfection is commonly needed throughout many industries. UV light is light in the ultraviolet light spectrum ranging from 100 to 400 nanometer ("nm") wavelengths. The utilization of UV light for disinfection can be done on a small or a large scale though different power sources. Small scale applications include, for example, hand-held devices for keyboards using battery power. Alternatively, large scale applications include utilizing UV light disinfection with electric power, as is the case for water treatment plants.

UV light kills organisms acutely or as they try to replicate, by destroying the nucleic acids contained in the various organisms. Water-related diseases are classified into 3 major groups: waterborne diseases (ingestion=infection), water-washed diseases (inadequate clean water for hygiene use), and water-based diseases (microorganisms live in contaminated water and penetrate skin) UV light for disinfection, specifically utilized at the point-of-use, can have a huge impact on completely eliminating or significantly reducing the following types of diseases, to name a few:

|  | Organism | Impact |
|---|---|---|
| Waterborne Diseases | | |
| Cholera | *Vibrio cholerae* | Pandemic risks, 25-50% mortality |
| Typhoid | *Salmonella typhi* | 17 million cases in 2000 |
| Salmonellosis | other *Salmonella* | 1.4 million cases in U.S. annually |
| Dysentery | *Shigella* | 600,000 deaths/yr < age 5 yrs |
|  | *E. histolytica* | 100,000 deaths/yr, 480 million cases |
| Cryptosporidiosis | *Cryptosporidium* | 17% of all childhood diarrhea |
| Giardiasis | *Giardia lamblia* | 30% prevalence in tropics |
| Hepatitis | Hepatitis A | 42,000 cases in 2005 |
| Diarrhea | ETEC (*E. coli*) | 20% of all diarrheal cases |
|  | *Y. enterocolitica* | Food and Waterborne |
|  | *Campylobacter* | Food and Waterborne |
|  | *Balantidium coli* | 80% asymptomatic carriers |
|  | Norwalk virus | Seasonal epidemics |
|  | Rotavirus | #1 killer of children from diarrhea |
|  | Astroviruses | Worldwide distribution |
| Water-Washed Diseases | | |
| Guinea worm | *Dracunculus medinensis* | 55,000 cases worldwide |
| Trachoma | *Chlamydia trachomatis* | World's leading preventable cause of blindness. Nearly 10% of the global population at risk. |
| Scabies | *Sarcoptes scabei* | Chronic skin infection in over 300 million people worldwide |
| Water-Based Diseases | | |
| Schistosomiasis | *S. ovale, S. japonicum S. haematobium* | 200 million infections annually and 280,000 deaths/yr. |

The Millennium Development Goals (MDGs) accorded in the Millennium Declaration (2000) by the United Nations seeks to provide clean water and basic sanitation to over 600 million people by the year 2015. Cost estimates for the required investment to reach the MDG goal are in the rage of $11.3 billion per year in clean drinking water (and sanitation), which is estimated to yield an annual return of nearly $84 billion per year. It is necessary to develop systems and methods to provide clean water to large populations at the point-of-use in remote areas.

SUMMARY

Embodiments of the present invention address the above needs and/or achieve other advantages by providing apparatuses (e.g., a system, and/or other device) and methods for a water disinfection system that is used in remote areas and powered from a number of sources.

Generally, embodiments of the point-of-use solar powered water disinfection device and custom water storage container are used to remove harmful water-borne, water-washed, and water-based diseases from water, so people living in remote areas of the world or areas struck by natural disasters will have clean water for drinking, cooking, washing, etc. Embodiments herein disclosed, provide for a system that utilizes an ultraviolet light that is operatively coupled to a pump, inverter, battery, and a converter, and is adapted for use with both solar energy and AC current. The device is placed into a storage container, or the like, containing water, and the water in the storage container is pumped through a cavity encasing the ultraviolet light, which disinfects the water as it passes through the cavity.

One embodiment of the invention is a water disinfection system for disinfecting water. The water disinfection system comprises a housing; a charge controller connected to the housing; a battery connected to the housing and operatively coupled to the charge controller; a connecter operatively coupled to the charge controller and to an external power source; an inverter connected to the housing and operatively coupled to the charge controller; an ultraviolet light connected to the housing and operatively coupled to the inverter; and a pump connected to the housing and operatively coupled to the inverter.

In another embodiment of the invention the external power source is solar power cells or a AC power supply.

In further accord with an embodiment of the invention the housing comprises at least one inlet operatively coupled to the pump and at least one exit operatively coupled to an ultraviolet light housing. The ultraviolet light housing forms a cavity at least partially encasing the ultraviolet light, wherein the ultraviolet light housing is operatively coupled to the pump.

In another embodiment of the invention the water disinfection system further comprises a handle connected to the housing for installing and removing the water disinfection system from a container of water.

In yet another embodiment if the invention the water disinfection system further comprises a securing device connected to the housing for connecting the water disinfection system to a container or other structure.

In another embodiment of the invention the water disinfection system further comprises at least one switch connected to the housing and operatively coupled to the water disinfection system, for controlling charging of the battery and operation of the water disinfection system.

In further accord with an embodiment of the invention the water disinfection system further comprises a timer connected to the housing and operatively coupled to the water disinfection system.

In another embodiment of the invention the water disinfection system further comprises operating indicator displays connected to the housing and operatively coupled to the water disinfection system for illustrating the battery status, if a fault is detected in the system, and if the power is on.

In yet another embodiment of the invention the water disinfection system further comprises a storage container. The storage container comprises a storage housing and a lid connected to the storage housing. The water disinfection system is at least partially submerged in water inside the storage housing.

Another embodiment of the invention is a water disinfection system for disinfecting water. The water disinfection system comprises a housing, wherein water is cycled through the housing. The water disinfection system further comprises a pump operatively coupled to the housing and at least one power source for cycling the water though the housing. The water disinfection system further comprises an ultraviolet light operatively coupled to the housing and the at least one power source for disinfecting the cycled water.

In further accord with an embodiment of the invention the at least one power source is a battery. In another embodiment of the invention the at least one power source is a solar power cell. In yet another embodiment of the invention the at least one power source is a AC power supply.

In yet another embodiment of the invention the water disinfection system further comprises a charge controller operatively coupled to the housing and the at least one power source for regulating power from the at least one power source.

In another embodiment of the invention the water disinfection system further comprises an inverter operatively coupled to the housing and the at least one power source for converting the current from the at least one power source.

In yet another embodiment of the invention the at least one power source is operatively coupled to the housing.

In further accord with an embodiment of the invention the water disinfection system further comprises a connector operatively coupled to the at least one power source and the water disinfection system.

In another embodiment of the invention, the housing comprises a housing inlet and a housing outlet. The water is cycled into the housing inlet, through the housing, and out of the housing outlet.

In yet another embodiment of the invention the water disinfection system further comprises a handle for installing and removing the water disinfection system from a container of water.

In another embodiment of the invention the water disinfection system further comprises a securing device operatively coupled to the housing for connecting the water disinfection system to a container or other structure.

In further accord with an embodiment of the invention the water disinfection system further comprises at least one switch operatively coupled to the housing and the water disinfection system, for controlling the operation of the water disinfection system.

In yet another embodiment of the invention the water disinfection system further comprises a timer operatively coupled to the housing and the water disinfection system.

In another embodiment of the invention the water disinfection system further comprises operating indicator displays operatively coupled to the housing and the water disinfection system illustrating the operation of the system.

In further accord with an embodiment of the invention the water disinfection system further comprises a storage container. The storage container comprises a storage housing and a lid operatively coupled to the storage housing. The water disinfection system is at least partially submerged in water inside the storage housing.

Another embodiment of the invention is a water disinfection system for disinfecting water. The water disinfection system comprises a housing, wherein the housing has a housing inlet and a housing outlet. The water disinfection system further comprises a charge controller operatively coupled to the housing. The water disinfection system further comprises a battery operatively coupled to the housing and to the charge controller. The water disinfection system further comprises a connecter with a first end operatively coupled to the charge controller and a second end that is configured to be operatively coupled to an external power source. The water disinfection system further comprises an inverter operatively coupled to the housing and to the charge converter. The water disinfection system further comprises an ultraviolet light housing operatively coupled to the housing. The ultraviolet light housing comprises an ultraviolet housing cavity and an ultraviolet bulb operatively coupled to the ultraviolet light housing and the inverter. The water disinfection system further comprises a pump operatively coupled to the housing and to the inverter, for pumping water from the housing inlet through the ultraviolet housing cavity and out the housing outlet.

In another embodiment of the invention the housing comprises a dry chamber and a wet chamber. The charge controller, battery, and inverter are operatively coupled to the dry chamber and the ultraviolet light housing and the pump are operatively coupled to the wet chamber.

In yet another embodiment of the invention the external power source is solar power cells or a AC power supply.

In further accord with an embodiment of the invention the water disinfection system comprises a handle operatively connected to the housing for installing and removing the water disinfection system from a container of water.

In another embodiment of the invention the water disinfection system further comprises a securing device operatively coupled to the housing for operatively coupling the water disinfection system to a container or other structure.

In yet another embodiment of the invention the water disinfection system further comprises at least one switch operatively coupled to the housing and to the water disinfection system, for operating the water disinfection system.

In further accord with an embodiment of the invention the water disinfection system further comprises a timer operatively coupled to the housing and to the water disinfection system, for indicating the amount of time the water disinfection system should operate.

In another embodiment of the invention the water disinfection system further comprises operating indicator displays operatively coupled to the housing and to the water disinfection system for illustrating the battery status, if a fault is detected in the system, and if the power is on.

In yet another embodiment of the invention the water disinfection system further comprises a storage container. The storage container comprises a storage housing and a lid operatively coupled to the storage housing. The water disinfection system is at least partially submerged under water inside the storage housing.

Another embodiment of the invention is a water disinfection system for disinfecting water. The water disinfection system comprises a housing, wherein the housing is waterproof and comprises a dry chamber and a wet chamber with a housing outlet and a housing inlet. The water disinfection system further comprises a charge controller connected to the dry chamber of the housing. The water disinfection system further comprises a battery connected to the dry chamber of the housing and operatively coupled to the charge controller. The water disinfection system further comprises a waterproof connecter with a first end operatively coupled to the charge controller through a waterproof opening in the dry chamber of the housing and a second end that is configured to be operatively coupled to an external power source, wherein the external power source comprises solar power cells or an inverter cable that is configured to operate with an AC power supply. The water disinfection system further comprises an inverter connected to the dry chamber of the housing and operatively coupled to the charge converter. The water disinfection system further comprises an ultraviolet light housing connected to the wet chamber of the housing. The ultraviolet light housing comprises an ultraviolet housing inlet leading to an ultraviolet housing cavity leading to an ultraviolet housing outlet, wherein the ultraviolet housing outlet is connected to the housing outlet though a waterproof seal. The ultraviolet light housing further comprises an ultraviolet bulb connected within the ultraviolet housing cavity, wherein the ultraviolet bulb is operatively coupled to the inverter with a wire though a waterproof opening between the wet chamber and the dry chamber. The water disinfection system further comprises a pump connected to the wet chamber of the housing, for pumping water through the ultraviolet light housing. The pump comprises a pump inlet and a pump outlet, wherein the pump outlet is connected to the ultraviolet housing inlet through a waterproof seal and the pump inlet is connected to the housing inlet through a waterproof seal. The pump is operatively coupled to the inverter with a wire through a waterproof opening between the wet chamber and the dry chamber.

In further accord with an embodiment of the invention the water disinfection system further comprises a battery switch operatively coupled to the charge controller, a connector switch operatively coupled to the charge controller, a timer operatively coupled to the battery, and operating indicator displays illustrating the battery status, if the battery is charging, a fault is detected in the system, the power is on, and the ultraviolet bulb is functioning properly. The battery switch, the connector switch, the timer, and at least one of the operating indicator displays are located on one or more panels that are connected to the housing.

In yet another embodiment of the invention the water disinfection system further comprises a handle connected to the housing and an eyelet connected to the handle or the housing.

In another embodiment of the invention the water disinfection system is operatively coupled to a storage container. The storage container comprises a storage housing and a lid with a through hole opening having screens. The lid is connected to the storage housing and water is filtered through the screens for removing debris from the water.

In yet another embodiment of the invention the water disinfection system further comprises a removable lock and cable system connected to the storage housing, wherein the cable is thread through the eyelet and locked to the storage housing. The water disinfection system further comprises a seating ring connected to the storage housing, wherein the seating ring provides a stable surface to position and connect the water disinfection system in the storage housing. The water disinfection system further comprises a spout connected to the storage housing for accessing the disinfected water without contaminating the disinfected water. The water disinfection system further comprises at least one water line illustrating the ideal level of water to disinfect.

Another embodiment of the invention is a method for disinfecting water using a water disinfection system. The method comprises inserting a water disinfection system into a storage container. The method further comprises activating the water disinfection system. The method further comprises monitoring the operating indicator displays illustrating the operation of the water disinfection system. The method further comprises removing the water disinfection system from the storage container with out re-contaminating the water.

In further accord with an embodiment of the invention the method further comprises pouring source water through a filter into the storage container to remove debris.

In yet another embodiment of the invention the method further comprises charging a battery in the water disinfection system by operatively coupling the water disinfection system to solar power cells or a power supply.

In another embodiment of the invention the method further comprises supplying power directly to the water disinfection by operatively coupling the water disinfection system to solar power cells or a power supply.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figures 1, 2A, 2B:
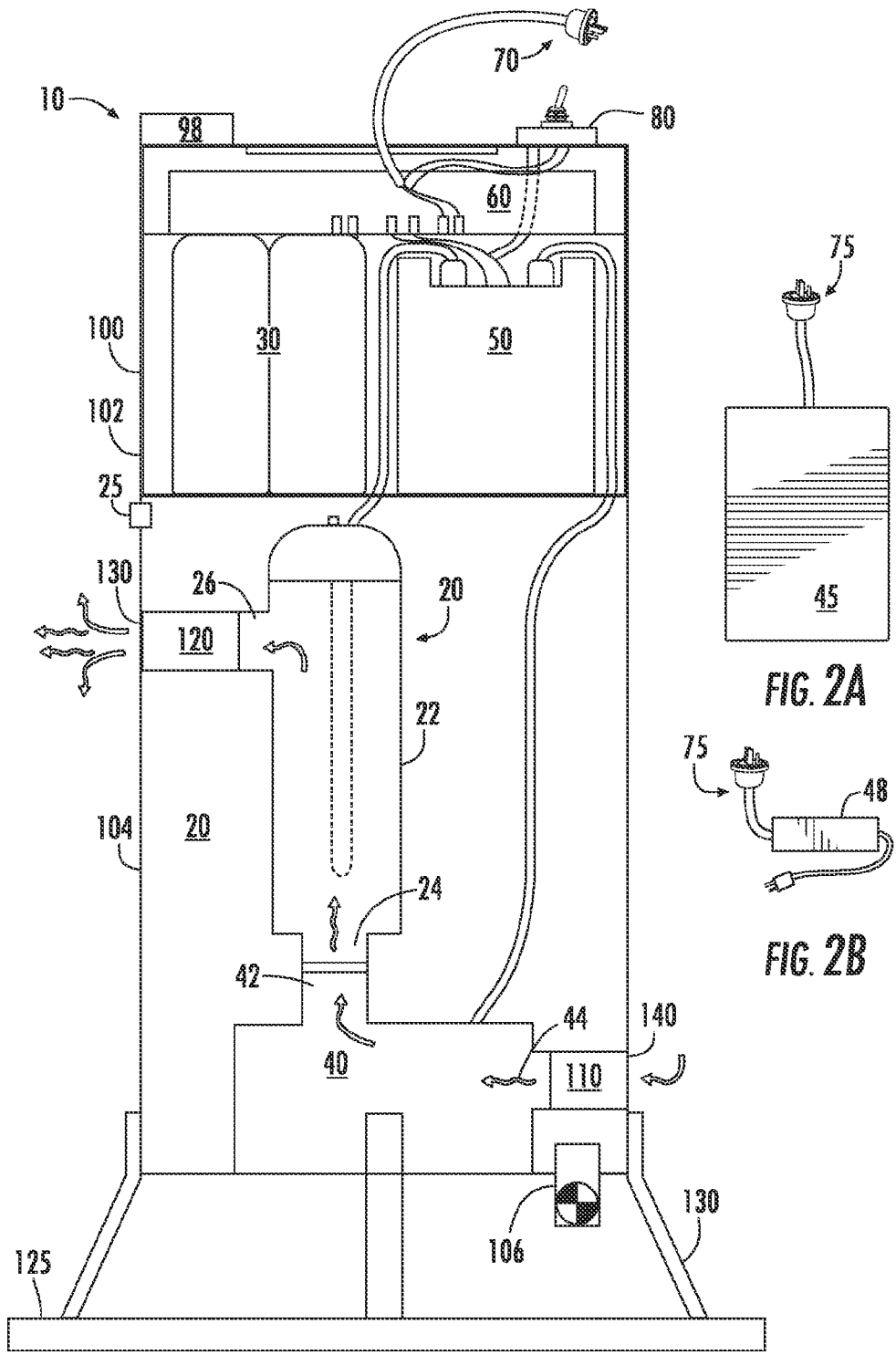
Figure 3:
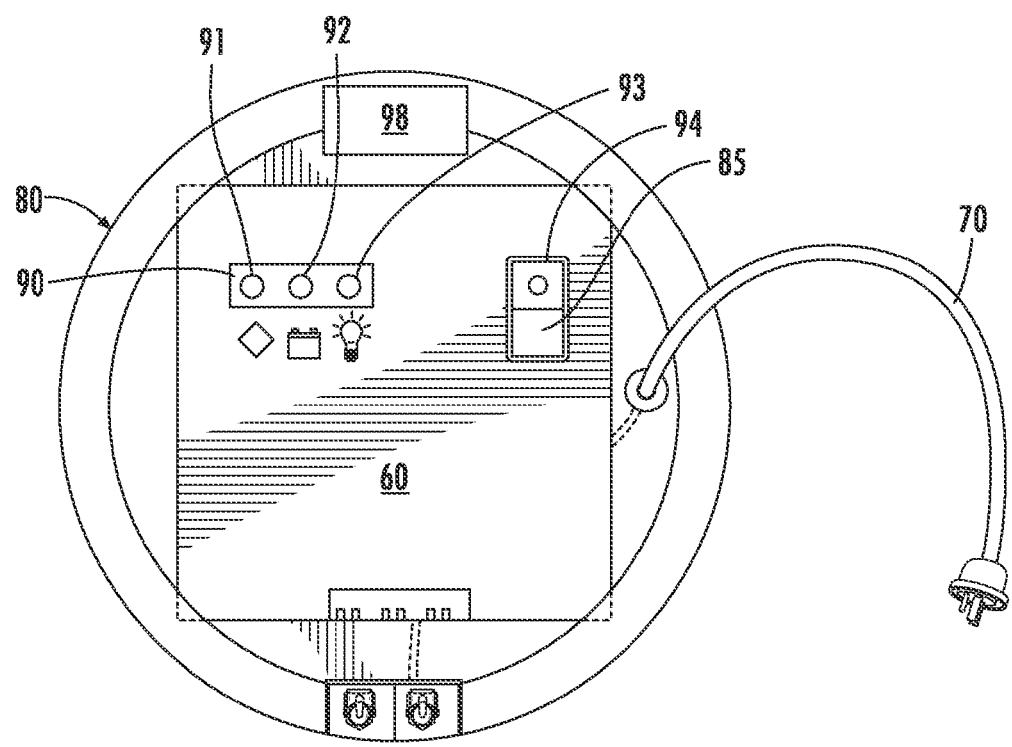
Figure 4:
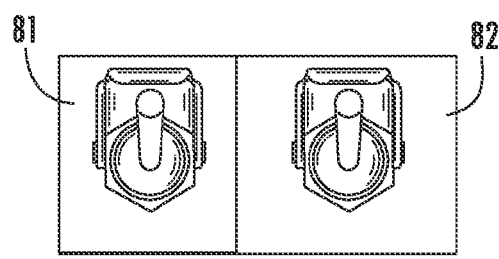
Figure 7:
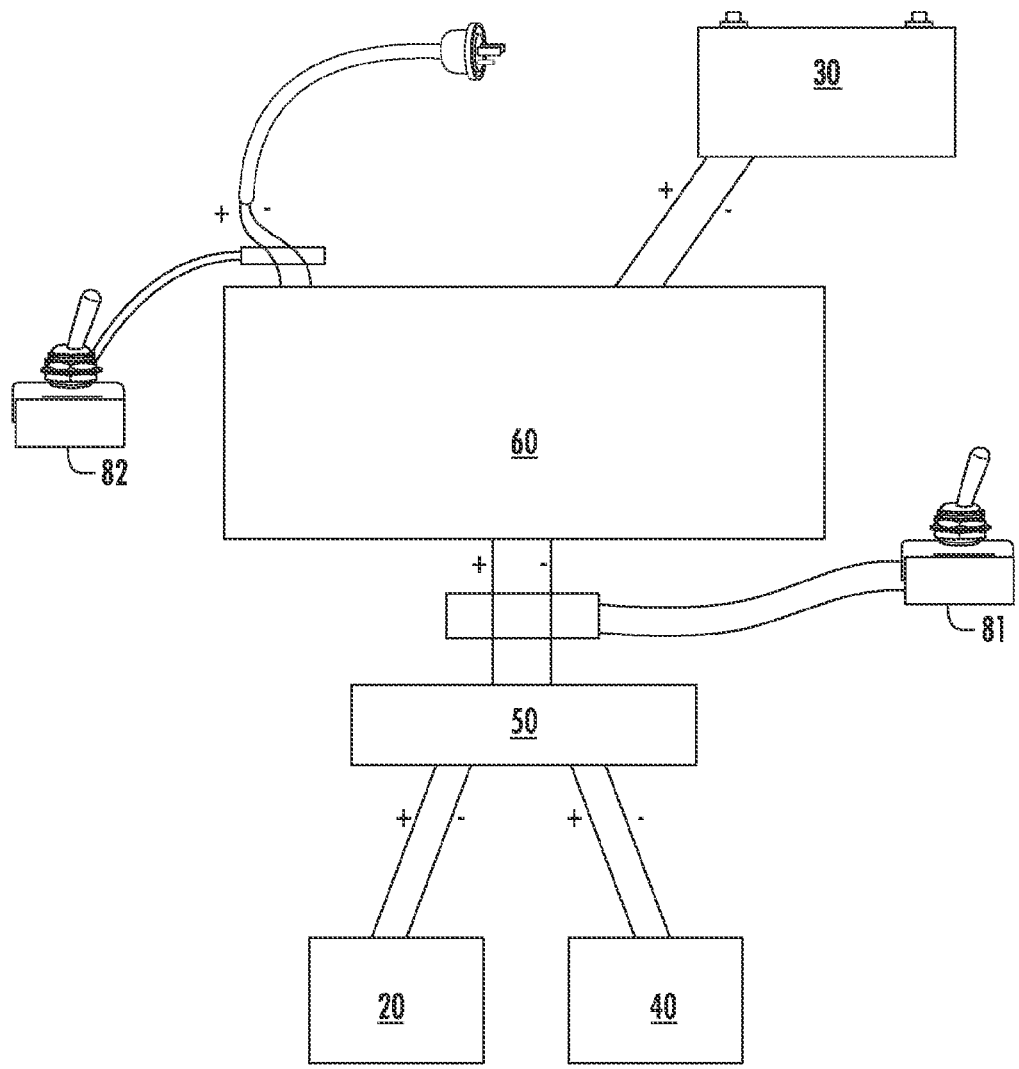
Figure 8:
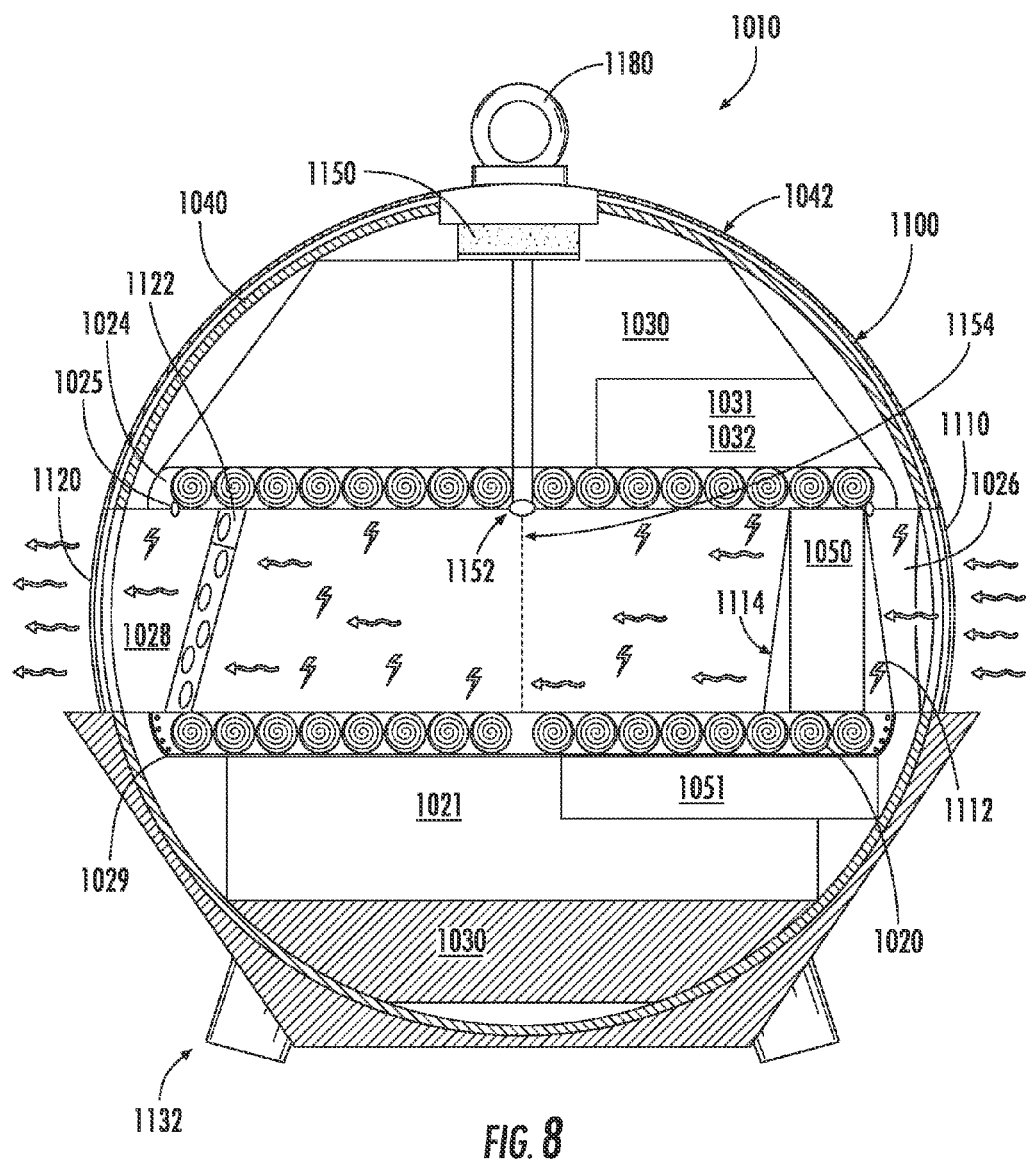
Figure 9:
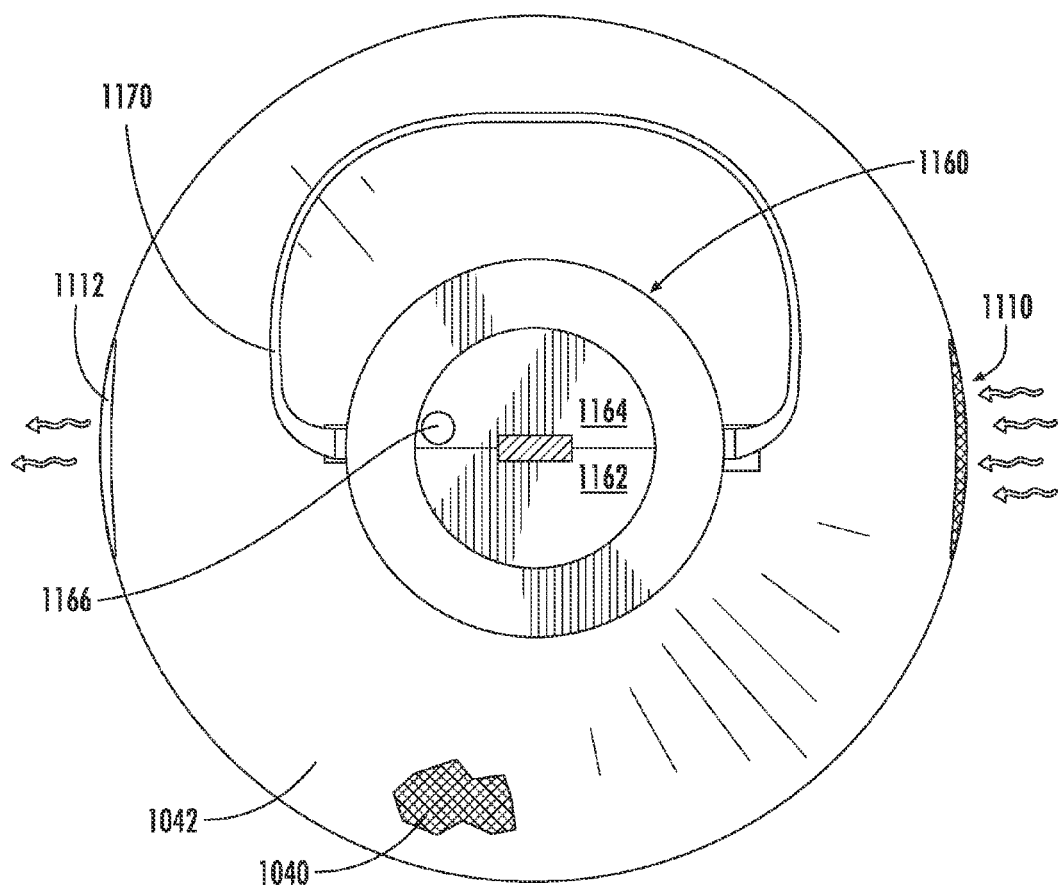
Figure 10:
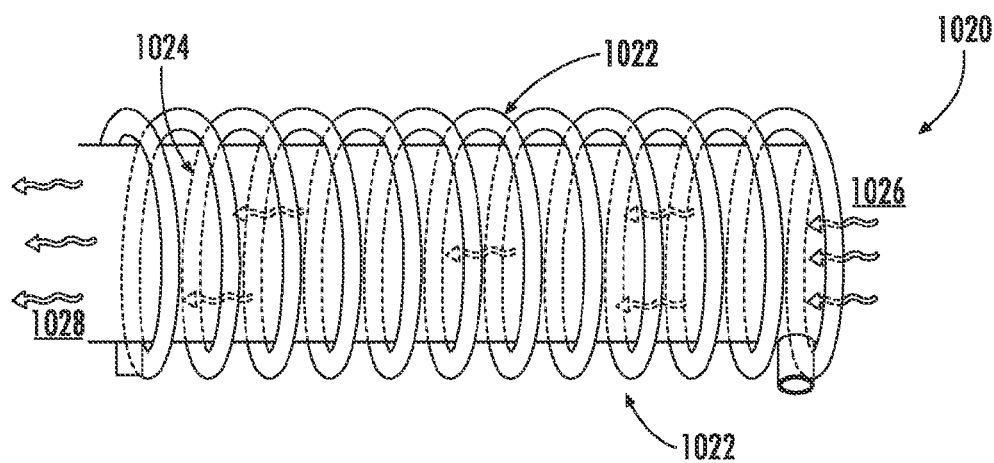
Figure 11:
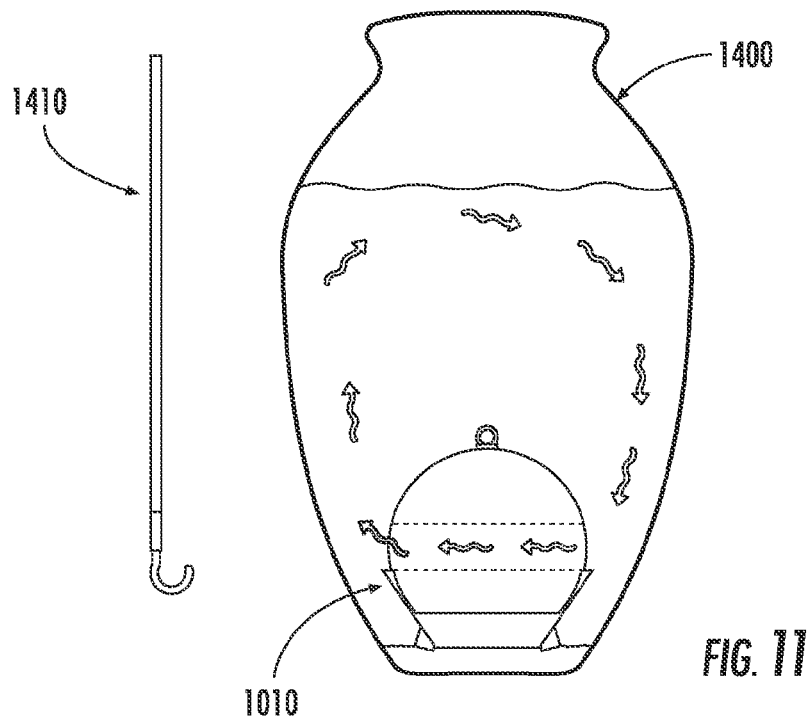
Figure 12:
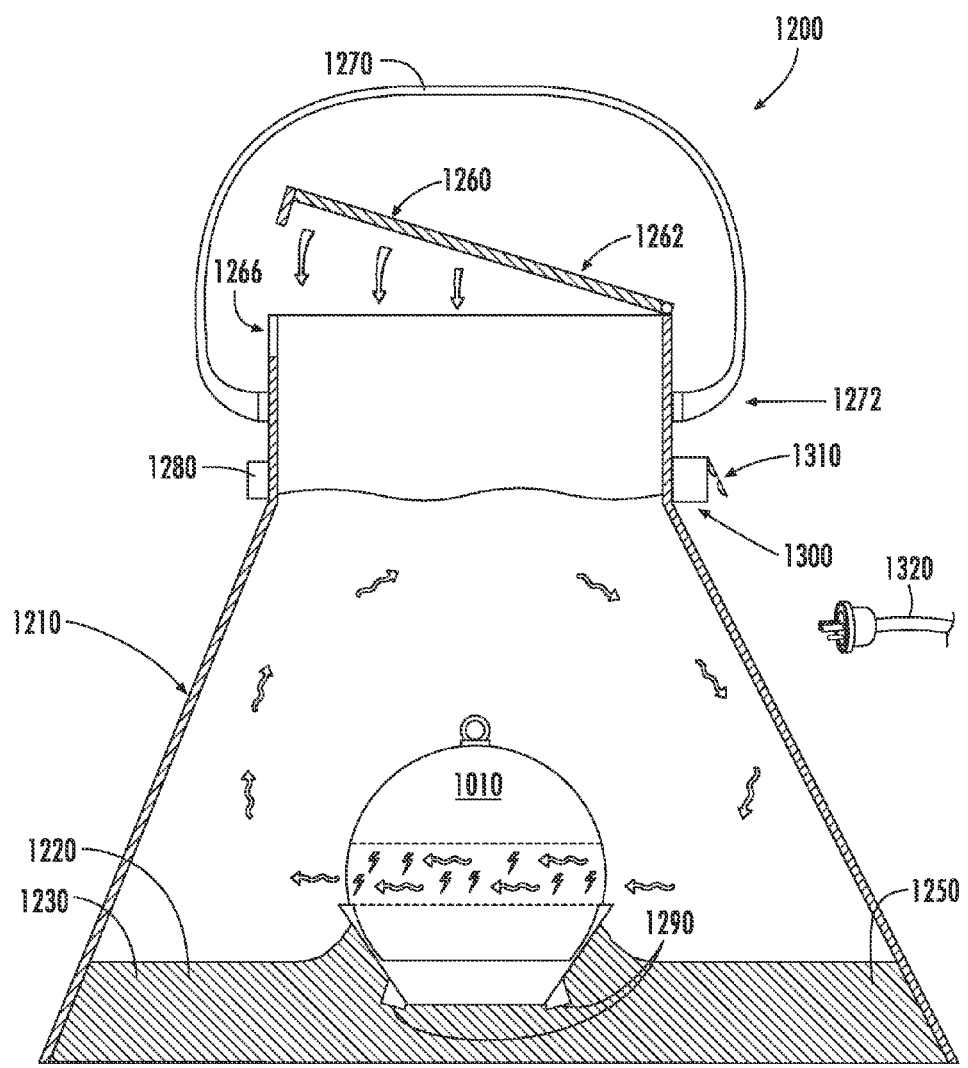
Figure 13:
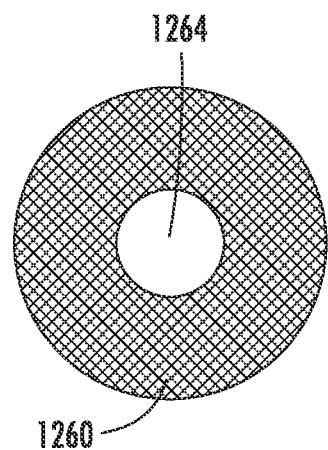
Figure 14:
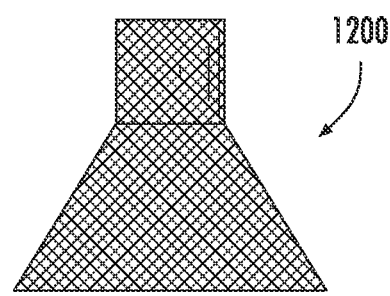

Having thus described embodiments of the invention in general terms, reference may now be made to the accompanying drawings:

FIG. 1 illustrates a cross-sectional view of the water disinfection system, in accordance with one embodiment of the invention;

FIG. 2A illustrates a solar power component for the water disinfection system, in accordance with one embodiment of the invention;

FIG. 2B illustrates an AC inverter cable power components for the water disinfection system, in accordance with one embodiment of the invention;

FIG. 3 illustrates a top view of the water disinfection system, in accordance with one embodiment of the invention;

FIG. 4 illustrates a top view of the control switches for the water disinfection system, in accordance with one embodiment of the invention;

FIG. 5 illustrates a side view of the water disinfection system submerged in the water storage container, in accordance with one embodiment of the invention;

FIG. 6 illustrates a top view of the water storage container, in accordance with one embodiment of the invention;

FIG. 7 illustrates a circuit diagram of the water disinfection system, in accordance with one embodiment of the invention;

FIG. 8 illustrates a cross-sectional view of the water disinfection system, in accordance with another embodiment of the invention;

FIG. 9 illustrates a top view of the water disinfection system, in accordance with another embodiment of the invention;

FIG. 10 illustrates a side view of the ultraviolet lamp used in the water disinfection system, in accordance with another embodiment of the invention;

FIG. 11 illustrates a cut-away side view of the water disinfection system submerged in the water storage container, in accordance with another embodiment of the invention;

FIG. 12 illustrates another cut-away side view of the water disinfection system submerged in the water storage container, in accordance with one embodiment of the invention;

FIG. 13 illustrates a top view of the water storage container, in accordance with another embodiment of the invention; and FIG. 14 illustrates a side view of the water storage container, in accordance with another embodiment of the invention.

DETAILED DESCRIPTION OF EMBODIMENTS OF THE INVENTION

Embodiments of the present invention will now be described with reference to the accompanying drawings, in which some, but not all, embodiments of the invention are shown.

The invention may be embodied in many different forms and should not be construed as limited to the embodiments set forth herein; rather, these embodiments are provided so that this disclosure will satisfy applicable legal requirements. Like number refer to like elements throughout.

FIGS. 1 through 5 illustrate a water disinfection system 10, in accordance with one exemplary embodiment of the present invention. The water disinfection system 10 generally comprises a UV lamp and housing system 20, a battery 30, a pump 40, an inverter 50, a charge controller 60, a connector 70, and a housing 100. In one embodiment of the invention, there is a panel 80 for displaying operating indicators 90 and switches 81, 82 for switching between a charging setting and a disinfect setting. In one embodiment of the invention, the water disinfection system 10 also comprises a fixed handle 170 and in some embodiments the handle comprises an eyelet 95 detachably secured to or integral with the handle 170. In one embodiment of the invention, a waterproof ON/OFF button 85 may be located on the panel 80, or other location, of the water disinfection system 10 in order to activate or deactivate the entire system, or individual components in the system, such as but not limited to the charge controller 60. In other embodiments of the invention, a timer 98 is attached to the water disinfection system 10, for example on the panel 80, or on the handle 170. Throughout the specification the term waterproof is used to describe various components, it is to be understood that the term waterproof could mean a watertight barrier that cannot be breached by water or in other embodiments waterproof could mean that a component is water resistant, such that the waterproof component could be breach by a minimal amount of water.

The water disinfection system 10 is sized generally as a portable system and comes in various sizes. However, in some embodiments, the water disinfection system 10 is sized for a permanent installation in a particular area. As illustrated in FIGS. 1 though 6 the water disinfection system 10 represented is sized generally (the drawings are not to scale) for a 55 gallon flat bottomed storage container 200. In one embodiment of the invention, the water disinfection housing 100 that secures and/or contains the various components for the water disinfection system 10 is approximately 27-35" tall, by a 9⅝" foot plate diameter and a 6⅝" top diameter. However, as previously stated the water disinfection system 10 comes in various sizes that will work in conjunction with various sized storage containers.

As illustrated in FIG. 1, in one embodiment, the housing 100 is a columnar vertical housing constructed of stainless steel, such as T304. Stainless steel has the advantage over other materials in that microbial organisms will not bond or stick to stainless steel. In other embodiments the housing 100 is made of PVC material and coated with a waterproof paint containing an anti-bacterial/anti-mold product to prevent surface contamination. However, it is understood that the housing 100 can be a variety of different shapes, material, and sizes. In one embodiment of the invention the housing 100 has at least one housing inlet 110. In some embodiments the housing inlet 110 is constructed of a stainless steel pipe and has a ½" internal diameter. The housing inlet 110 is sized to be coupled with the pump inlet 44. In other embodiments the housing 100 also has at least one housing outlet 120. In some embodiments the housing outlet 120 is constructed of a stainless steel pipe and has a ⅜" internal diameter. The housing outlet 120 is sized to be coupled with the UV light housing outlet 26. The housing inlets and outlets allow for water circulation into and out of the housing 100.

In other embodiments of the invention the housing 100 has multiple inlets and outlets that are operatively coupled to a pump 40 and a UV lamp system 20. Additionally, the housing inlet 110 and housing outlet 120 vary in size and configuration to match the pump 40, UV lamp system 20, and housing 100 types/sizes, which are determined based on the size of the water container in which the water disinfection system 10 is to be used. For example, the housing outlet 120 is sized for a pump 40 that prevents water from exiting the UV lamp system 20 before the water is properly disinfected (i.e. a pump that displaces 2 gallons of water per minute), as will be discussed later.

In some embodiments of the invention, the housing 100 has a foot plate 125 and/or removable feet 130 constructed of stainless steel. However, the foot plate 125 and/or removable feet 130 can be made from various materials. The foot plate 125 and/or removable feet 130 are used for positioning and stabilization at the bottom of the storage container 200.

In some embodiments of the invention, as illustrated in FIG. 5, a fixed handle 170 with an eyelet 95 or ring, made of stainless steel or another material, is coupled to the top of the housing 100. The handle 170 allows a person to secure or remove the water disinfection system 10 to or from the storage container 200 without having to reach into the storage container 200, initiating hand-to-water contact, and re-contaminating disinfected water. In other embodiments a cord or other removal element is used to allow a person to remove the water disinfection system 10 from the storage container 200 without re-contaminating the water. The eyelet 95 can also help facilitate removing the water disinfection system 10 from a storage container 200 in some embodiments of the invention. However, the eyelet 95, or similar device, provides security for the water disinfection system 10 when the eyelet is coupled to a cable/lock 250 attached to the storage container 200 or other structure.

Powering UV light for disinfection systems over time could prove difficult in remote locations or areas that have experienced naturals disasters, which often have limited or no electricity. A majority of the water related diseases previously discussed occur in equatorial regions where the sun serves as an abundant renewable source of energy. Solar energy is harnessed using photovoltaic cell technology in these equatorial regions, and anywhere else water related diseases are found. Compact and portable PV cells are available to run electrical components of various sizes. PV cells utilizing the sun's energy also charge batteries for energy storage in periods of low sunlight or for use at alternate times for running components of various sizes. Therefore, these PV cells are applicable for use in areas that experience not only long periods of sun but also long periods of rain with little sunlight, such as in tropical and subtropical regions.

In one embodiment of the invention PV cells 45 are attached to the connector 70, to either power the pump 20 and UV lamp system 22 directly or indirectly by charging the battery 30. The PV cells 45, in one embodiment, could be a F15-600 10 watt Foldable PowerFilm (15.4 volt, 0.6 A) Series type. This type of PV cell has the ability to fold up into a portable size for easy transport or can be secured to a roof or other area permanently. In other embodiments of the invention other types of PV cells 45 are used that vary in size, watts, voltage, amperage, and have a portable or fixed configuration. For example, in some embodiments the PV cells 45 are in a permanent configuration, such as an array. Therefore, the PV cells 45, in some embodiments, are transported with the water disinfection system 10 wherever it goes. In other embodiments, the PV cells 45 are fixed, and the water disinfection system 10 is brought to the PV cells 45 for disinfecting water or for charging the battery 30. The portability of the Power-Film PV cells 45 and the ability to attach and detach them to the water disinfection system 10 maximizes the point-of-use capability of the water disinfection system 10. This configuration allows a user to charge/operate the water disinfection system 10 in multiple locations with varying sunlight exposure at different times of the day through various power sources.

In one embodiment of the water disinfection system 10, the connector 70 is a female type, marine grade, waterproof type connector, such as a MSD Ignition 8173-MSD Weathertight Sealed Connector, 2-Pin, Female Shroud with Pins and Seals. The PV cells 45 in some embodiments have the male type, marine grade, waterproof connector 75, such as the connectors found standard on the PowerFilm connections, 2-Pin, Male Tower with Pins and Seals. The matching male and female connectors, in other embodiments of the invention can vary in size and type, but in most embodiments should be safe if immersed in water. In other embodiments of the invention, the waterproof connector 70 is secured to other locations on the housing 100 besides the panel 80. Furthermore, the waterproof connector 70, in other embodiments, is operatively coupled to an inverter/power cable 48, as illustrated in FIG. 2B, in order to supply power to the water disinfection system 10 or to charge the battery 30 through an electrical AC outlet. The plug entering the AC outlet may vary in size and type depending on the standards of the location in which the water disinfection system 10 is used. In other embodiments a universal adapter is also used as a part of or in conjunction with the inverter/power cable 48, if necessary. The inverter/power cable 48 allows for those areas in need of water disinfection that have electric power to charge or operate the water disinfection system 10 without relying solely on solar power. In other embodiments of the invention other types of power are used to charge or operate the water disinfection system 10, such as but not limited to wind power, hydropower, etc.

In some embodiments of the invention, the housing 100 houses a charge controller 60, a battery 30, and an inverter 50. Generally, the charge controller's function in the water disinfection system 10 is to draw current from the external power source, through the connector 70 and charge the battery 30 directly, or through the use of the inverter 50 if the type of current needs converting. In one embodiment of the invention, the charge controller 60 is a solar/DC charge controller, having for example a 120 W and 10 A Rate. The DC charge controller is designed for charging a battery, such as a 12.8V LiFePO4 battery with a 128 Wh and 30 A rate. The charge controller 60 is also designed to prevent battery overcharge, prevent back flow of electricity from the battery 30 to the PV cells 45 or inverter/power cable 48. In some embodiments of the invention the charge controller 60 is moisture proof and has a built-in LED display to signal the level of the battery charge. Both the battery 30 and the inverter 50 are operatively connected to the DC charge controller 60. The inverter 50 is also operatively connected to the UV lamp system 20 and the pump 40. In one embodiment of the invention, the charge controller 60, battery 30, and/or inverter 50 are placed in a vertical position inside of a "dry chamber" 102. In some embodiments the "dry chamber" 102 is a fireproof, waterproof, metal chamber; however in other embodiments the chamber is made of other materials. In some embodiments of the invention, the DC charge controller 60 is located vertically above the inverter 50 and battery 30. In other embodiments of the invention the charge controller 60, battery 30, and inverter 50 vary in type, wattage, amperage rate, capacity, location, and configuration.

In one embodiment, the panel 80 as illustrated in FIG. 4, is located on the top of the water disinfection system 10. In most embodiments, the panel 80 is ideally located above the waterline in the storage container 200, which prevents recontamination of the water supply when the switches are activated or de-activated by a user. In one embodiment of the invention, as illustrated in FIG. 4 and FIG. 7 there are 2 toggle 2-way switches on the panel 80. The connector toggle 82 is wired to control the circuit for the connector 70. The battery toggle 81 determines the circuit from the battery to the UV system 20 and pump 40. In one embodiment both toggles are set in the "CHARGE" position when the water disinfection system 10 is out of the water and plugged into an external power source. In another embodiment of the invention, the toggle switches are set in the "DISINFECT" position when the water disinfection system 10 is submerged in the storage container 200, in order to disinfect the water in the storage container 200. In some embodiments of the invention, another toggle switch is used to select the power source to run the water disinfection system 10 as either the battery 30 or the external power source. Still in other embodiments, the while the toggle switches are set to "DISINFECT" the water disinfection system 10 is running on power from either the battery 30, the external power sources, or a combination of both. In some embodiments of the invention, the switches are covered with a waterproof material, such as a APM Hex-seal Accessory, Boot, Toggle, Silicone Rubber, Brass, Nickel Plated cover, or other waterproof material.

In some embodiments of the invention, a timer 98 is located on the panel 80 of the water disinfection system and is directly connected to the inverter 50. In some embodiments the timer 98 is automatically activated when the toggle switches 81, 82 are placed in the "DISINFECT" position. The timer 98, which is waterproof in some embodiments, is used to provide an alarm after the water disinfection cycle is complete. In some embodiments of the invention, the time on the timer 98 for disinfection is preset based on the volume of water present for disinfection. However, in other embodiments of the invention the timer 98 is set by the user based on the volume of water present for disinfection. In other embodiments of the invention, a sensor is used to test the water and alert the user when the water disinfection system 10 has disinfected the water. Still in other embodiments of the invention the type and location of the timer 98 may vary, for example the timer in some embodiments is located on the top of the handle 170. In other embodiments the timer 98 is run on its own battery power and has its own On/Off button to activate it and begin the countdown. The separate battery powered timer 98 would allow the timer to be easily replaced if it were to fail without dismantling the disinfection system 10.

As illustrated in FIG. 1, in one embodiment of the invention the UV lamp system 20 is positioned vertically within the housing 100, below the DC charge converter 60, the battery 30, and the inverter 50 and above the pump 40. In one embodiment the UV lamp system 20 is made up of a UV lamp housing 22, with a UV lamp housing inlet 24 and UV lamp housing outlet 26. A UV bulb 28 is secured within the UV lamp housing 22. The UV lamp housing 22 of the UV lamp system 20 shields the UV bulb 28 to prevent UV damage to the other components and prevent injury to operators of the water disinfection system 10.

In one embodiment of the invention, the UV bulb 28 is a R-Can 0.5-2 GPM SC Copper Series UV System (110V) by Sterilight. In the embodiment using the Sterilight bulb and Pondmaster pump described herein, the Sterilight bulb manufacturer claims a 99.99% kill percentage based on the following parameters: 1) A flow rate of 0.5-2 GPM through the UV lamp system; 2) a turbidity of <1 NTU; and 3) a time curve based on the flow rate to disinfect a given volume of water. In one embodiment of the invention, the flow rate through the UV lamp system 20 for a 55 gallon container has been properly preset through the use of a flow rate meter/valve for 2 gallons per minute. In other embodiments of the invention, a different type of bulb is used. However, a flow rate is determined for the bulb that guarantees killing a majority, in some embodiments up to 99.99% or more, of the microorganisms.

In some embodiments of the invention, the UV housing outlet 26 or the housing outlet 120 is a fixed or adjustable outlet which is fixed or adjustable based on the desired flow rate necessary to properly disinfect the amount of water in the storage container 200 based on the UV bulb 28 and the pump 40. In other embodiments of the invention, the type, size, manufacturer, lamp, housing, and gallons per minute pumped for disinfection varies.

In one embodiment of the invention, a sight glass 25 is included in the housing 100 wall. The sight glass is used to detect a UV bulb 28 fault. In some embodiments of the invention, the UV lamp system 20 has a bulb indicator light 96 or other indicator that is visible through the sight glass 25. For example, if the bulb indicator light 96 is green the UV light bulb 28 is operating correctly. However, if the bulb indicator light 96 is red the UV bulb 28 would need to be replaced, which is done by removing the malfunctioning UV bulb 28 from the UV lamp housing 22 and replacing it with a new UV bulb 28. In other embodiments of the invention the bulb light indicator 96 is located on other areas of the water disinfection system 10, such as on the panel 80.

In some embodiments of the invention, the UV housing outlet 26 of the UV lamp system 20 is attached to the housing outlet 120, which then connects to the external surface of the housing 100. In some embodiments of the invention, an outlet screen 130 is coupled to the housing outlet 120 or the UV lamp housing outlet 26. The outlet screen 130 is used to cover the outflow exit in order to prevent debris from entering the water UV lamp system 20 or the pump 40. In some embodiments of the invention, the UV housing inlet 24 is attached to the pump outlet 42. The pump 40 also has a pump inlet 44 which is coupled to the housing inlet 110, which then connects to the external surface of the housing 100. In some embodiments of the invention, an inlet screen 140 is coupled to the housing inlet 110 or the pump inlet 44. The inlet screen 140 is used to cover the inlet entrance to prevent debris from entering the pump 40 and UV lamp system 20. The seals between the housing 100, the housing inlet 110, the UV lamp housing outlet 26, the UV lamp housing inlet 24, the pump exit 42, the pump inlet 44, and the housing outlet 120 are watertight seals. In some embodiments of the invention, the outlet screen 130 and the inlet screen 140 are mesh screens, for example a 18 mesh T316.009 stainless steel screen.

As illustrated in FIGS. 1 and 6, in one embodiment of the invention the UV lamp system 20 and pump 40 are housed in a separate "wet chamber" 104 section of the housing. The UV lamp system 20 and pump 40 are housed in a "wet chamber" 104 in order to protect the battery 30, inverter 50, and charge controller 60, from water damage. Generally, the water disinfection system 10 should not be submerged fully into the water. The water line in a storage container 200 should not be above the lower surface of the dry chamber 102. However, the water disinfection system 10 will work even if it is completely or almost completely submerged in water. The "wet chamber" 104, which stores the UV lamp system and pump 40 is typically dry. If the housing integrity is compromised, through a crack in the housing 100, failure of one of the seals, etc., and a leak occurs, it is recommended to discontinue use of the water disinfection system 10 until repaired. However, the UV light system 20 and the pump 40 are both able to operate if the "wet chamber" 104 is partially or completely filled with water.

In other embodiments of the water disinfection system 10, a drain 106 (i.e. petcock) is secured at or near the bottom of the water disinfection system to drain water from the wet chamber 104 if a leak occurs in the water disinfection system 10. The drain 106 remains closed during use of the water disinfection system 10, but may be periodically opened, when not in use, to allow water to drain from a compromised housing 100.

As illustrated in FIG. 1, the pump inlet 44 is coupled to the inlet housing 110 and the pump outlet 42 is coupled to the UV lamp housing inlet 24. The pump 40, when activated in unison with the UV lamp system 20 by the switches 81, 82 on the panel 80, draws water from the storage container 200, through the inlet screen 140, via the inlet pipe 110. The pump 40 then creates flow through the watertight connections into the UV lamp system 20 for disinfection, and out of the housing 100 via the outlet housing 120. In some embodiments of the invention, the housing outlet 120 is located near the top of the water line in the storage container 200 and the housing inlet 110 is located near the bottom of the storage container 200. In some embodiments of the invention the housing outlet 120 and the housing inlet 110 are also located on opposite sides of the housing 100. This configuration helps to improve the flow of water in the storage container 200. For example, it helps to prevent areas of stagnate water in the storage container 200, which insures that all of the water in the storage container 200 is passed through the UV lamp system 20, so that it is properly disinfected. In some embodiments of the invention the pump 40 is a Pondmaster Mag 2 Pond Pump, however, other types of pumps are used in this system or in other similar systems in accordance with other embodiments of the invention.

In one embodiment of the invention, as illustrated in the top view shown in FIG. 3, a panel 80, which in some embodiments is waterproof, is located on the top of the housing 100. The panel 80 allows the user to view the operating indicators 90. In some embodiments of the invention the panel 80 is located on the top of the housing 100, and has a clear cover, such as Plexiglas over at least a part of the panel 80. In one embodiment of the invention, the operating indicators 90, which are viewable through Plexiglas, comprise the following:

LIGHT #1 GREEN 91=solar or external source is charging the battery
LIGHT #2 GREEN 92=battery status (flashes when battery level is full)
LIGHT #3 RED 93=overload or short circuit in the system
LIGHT #4 RED 94=controller is ON In one embodiment of the invention, when the water disinfection system 10 is connected to an external power source and charging LIGHT #1 91 is GREEN. Otherwise the light is off when the water disinfection system 10 is not charging. In one embodiment of the invention, when the water disinfection system 10 is ready for use and the battery 30 is fully charged LIGHT #2 92 is GREEN or FLASHING GREEN. In one embodiment of the invention LIGHT #4 94 is lit RED when the water disinfection system 10 is ON. In some embodiments of the invention LIGHT #4 94 may have a waterproof ON/OFF Button 85 for turning the external power source on and off. If LIGHT #1 91 is not GREEN the water disinfection system 10 is not charging. If LIGHT #2 92 is not GREEN the battery 30 is not charged and the water disinfection system 10 is not ready for use. If LIGHT #3 93 is RED it indicates the water disinfection system 10 should not be used because there is a fault in the system. If LIGHT #4 94 is not RED the water disinfection system 10 should not be used because it is not on.

In some embodiments of the invention, there are other operating indicators 90 that are located on the panel 80. For example, the bulb indicator light could be located on the panel 80. If the bulb indicator light 96 that is visible through the sight glass 25 is not GREEN the bulb needs to be replaced or the device is not operating properly and should not be used. In other embodiments of the invention if water does not flow through the water disinfection system 10 then the pump may be malfunctioning and an operating indicator 90 is used to alert the user that the pump is malfunctioning. The user of the water disinfection system 10 monitors the operating indicators 90 during the operation of the water disinfection system 10, to ensure it is properly disinfecting the water.

In some embodiments of the invention LIGHT #2 92, the battery indicator, will turn YELLOW when the battery level is LOW or RED when the load cuts OFF indicating that disinfection is not complete and the battery 30 needs to be recharged or an external power system needs to be connected to complete the disinfection. If any lights are indicating an issue or not functioning properly the water disinfection system 10 should not be used for disinfection because the water might not be properly disinfected. In some embodiments of the invention, in addition to or in lieu of the toggle switches, there is a waterproof On/Off button or switch to activate the water disinfection system 10.

In other embodiments of the invention, more or less operating indicators 90 or different operating indicator displays are used to indicate if the water disinfection system 10 is operating properly and is in the proper setting to charge, power, and/or disinfect. In other embodiments of the invention the lights and switches are replaced with other indicators and buttons, to perform the same or similar tasks as described above. In some embodiments of the invention the operating indicators 90 are digital displays that electronically display the information related to the operation of the water disinfection system 10.

The system is designed for use with many different types of storage containers 200. However, in one embodiment of the invention, the storage containers 200 are pre-manufactured to work specifically with the water disinfection system 10. In other embodiments of the invention, the water disinfection system 10 is placed into storage containers 200 of various sizes and types to disinfect ranges of different amounts of water based on the size the water disinfection system 10 being used.

Regardless of the type of storage container 200 used, generally, in remote areas people bring water from a water source back to a point-of-use and use a filter to remove the larger particles and debris in the water. The typical filtration system used for the water at the point-of-use usually involves pouring water through a folded fine cloth or other type of screen. In some embodiments of the storage container 200 the typical cloth filtration step is removed by placing a screen in the lid 220 of the storage container 200. In some embodiments of the invention, the lid 220 is a 500 micron stainless steel screen, or other type of filtration screen placed across an opening in the lid 220 of a water storage container 200. In some embodiments of the invention the storage container 200 also has a cable/lock mechanism 250 that allows the user to secure the water disinfection system 10 to the storage container 200, in order to help prevent it from being stolen. Still in other embodiments of the invention the storage container 200 has a seating ring 240 to help secure and stabilize the water disinfection system 10 in the storage container 200. In some embodiments the seating ring 240 has slits 242 in it to help displace water when the water disinfection system 10 is placed in the storage container 200. In one embodiment of the invention the storage container 200 also has a spout 230 to easily remove water from the storage container 200 without re-contaminating the disinfected water. Still in other embodiments of the invention water lines, such as a max water line 210 or a minimum water line 215, are drawn or engraved in the storage container 200 to prevent the water disinfection system 10 from being fully submerged in water. If the water disinfection system 10 is fully submerged there is a risk of contamination of the water when the it is removed for recharging, possibly through contaminated hands or other tools. Alternatively, a fully submerged water disinfection system 10 is a risk in that the water could damage the system if there is a failure in the seals or a crack in the housing 100.

In some embodiments of the invention, the water disinfection system 10 is utilized in remote areas or after natural disasters. In these areas water is typically retrieved directly from ponds, rivers, lakes, and other bodies of water that contain tens of millions of pathogenic bacteria, viruses, or parasites. A typical scenario in which the water disinfection system 10 is used is when a villager brings buckets of water up from a contaminated riverbed for use by the villager's family. The villager pours the water through a sand filter or cloth, which is typical in most remote areas to strain out the sediment or debris, into a point-of-use container for the family to share. Water in this container may be used for drinking, bathing, washing, etc. However, the villager unknowingly allows tens of millions of dangerous and deadly microorganisms through the makeshift filter.

In order to disinfect the water gathered from the water source, the villager uses the water disinfection system 10. After checking that LIGHT #2 92 is GREEN or GREEN FLASHING (battery charged), the villager disconnects the device 10 from its external power source. The villager checks that the controller LIGHT #4 94 is RED, which indicates that the controller is ON. The villager then places the water disinfection system 10 that has been fully charged into the storage container 200 (i.e. a 55 gallon drum). The villager assures the water level is correct, via the max water line 210 and minimum water line 215, and switches the toggle switches 81, 82 to "DISINFECT". The villager then views that LIGHT #2 92 is SOLID GREEN indicating the battery has enough charge to power the pump 40 and the UV lamp system 20. The villager looks through the sight glass 25 and verifies that the UV bulb 28 indicator is GREEN and thus functional. The villager might also see water circulating around the container signifying the pump 40 is ON. The villager depresses the timer 98 to begin the countdown until disinfection of the water.

Periodically, the villager checks the operating indicators 90 on the panel 80 and through the sight glass 25 to ensure the battery indicator LIGHT #2 92 is GREEN, the UV bulb 28 indicator remains GREEN for the duration of the disinfection, LIGHT #3 93 is not RED, and LIGHT #4 94 stays RED. The contaminated water, throughout the duration of the time on the timer 98, is circulated through the inlet screen 140, inlet housing 110, pump 40, the UV housing inlet 24 and, into the UV housing 22. The UV bulb 28 destroys 99.99% of all microorganisms in the water. The clean water then flows from the UV system 20 through the UV housing outlet 26, through the outlet housing 120, through the outlet screen 130, and back into the storage container 200. When the preset timer alarms sounds the villager switches the toggle switches 81, 82 on the panel 80 to "CHARGE" and carefully removes the water disinfection system 10, via the handle 170 or eyelet 95, from the storage container 200, being careful not to touch the clean water. The water disinfection system 10 is then recharged, if necessary, by connecting the waterproof connector 70 to an external power source such as PV cells 45 that are placed in the sun. The disinfected water may now be consumed by the villager's family safely without fear of ingesting potentially fatal bacteria, viruses, or parasites. Additionally, water-washed and water-based diseases are eliminated by the water disinfection system 10 allowing the villager and his/her family to use the water for other uses, such as bathing and washing, without the risk of infection.

The water disinfection system 10 is an important and effective source of portable UV light for disinfecting water at its point-of-use. It can be used and distributed throughout the world as a single device to minimize illnesses and save millions of lives annually. As previously discussed in other embodiments of the invention the water disinfection system 10 may work in conjunction with other devices, including a predesigned storage container 200, as illustrated in FIGS. 5 and 6. The storage container 200 has built in water lines 210, 215 marking a predetermined maximum and minimum level of water for disinfection and to prevent the water disinfection system 10 from being submerged in the storage container 200. The storage container 200 has a removable filtration lid 220, a spout 230 to drain the clean water without risk of recontamination, a seating ring 240 with silts for seating the water disinfection system 10 on, and a security cable/stabilizer 250 attached to the upper wall of the drum for use through the eyelet 95 located on the top of the handle 170. In one embodiment the storage container 200 is a 55 gallon Poly Drum and measures 23.2"×33.8", but in other embodiments of the invention the storage container 200 is made of other materials and comes in various sizes. In some embodiments the drum is made of semi-opaque plastic material which allows for the visualization of the water level as water is poured into it.

In one embodiment of the invention a villager places the custom 55 gallon storage container 200 on an elevated platform, for example cinder blocks, to allow for easy access to the drain spout 230. Water is brought up from the water source and poured through the precut hole in the lid 220. The hole has a filter set 225 built into the lid 220, which in some embodiments are made of stainless steel. In one embodiment the ordered layers are T316 stainless steel 16 mesh 0.018, 500 Micron mesh 0.0010 T 316, and a second T316 stainless steel 16 mesh 0.018. However, in other embodiments various layers and other grades of mesh are used, but the goal is for maximizing removal of debris. The water level is viewed through the side of the drum as the water is poured through the filter set 225. In some embodiments of the invention, is not recommended to exceed the maximum water line or put less water than the minimum water line 215 indicates. After the storage container 200 is filled to the proper level the lid 220 is then removed and set aside to dry to prevent any drops of contaminated water from dripping into the storage container 200 after the water is disinfected. The fully charged water disinfection system 10 is then lowered into place and seated onto the ring 240 at the bottom center of the storage container 200. In one embodiment the ring is made of T306 stainless steel, and is perforated with slits 242 at the base to allow for water displacement as the device 10 is inserted. Water is displaced by the insertion of the water disinfection system 10, which in some embodiment is accounted for by the minimum and maximum water lines on the storage container 200 or on the water disinfection system 10 itself.

The cable/lock 250 mounted to the storage container 200 is threaded through the eyelet 95 or handle 170 on the top of the device 10 and secured in place. The toggle switches 81, 82 on the panel 80 are switched to "DISINFECT" after checking that the proper lights are ON, as previously discussed. Water then is observed flowing through the water disinfection system 10 and the sight glass 25 is used to observe a GREEN bulb indicator light 96, indicating the UV bulb 28 is operating properly. The preset timer 98 is started to countdown the predetermined minutes that ensure proper disinfection at the maximum water line. After the timer 98 alarm is triggered the cable/lock 250 is un-locked and the water disinfection system 10 is removed from the storage container 200 and recharged as necessary via the portable PV cells 45 or an AC outlet via the inverter/power cable 48. The spout 230 mounted on the side of the storage container 200 is used to safely remove the disinfected water. The lid 220 should only be replaced when the filter set 225 is completely dry to avoid recontamination of the water in the storage container 200.

FIGS. 8 through 11, illustrate another embodiment of the water disinfection system 1010, in accordance with one embodiment of the present invention. The water disinfection system 1010 generally comprises a UV light 1020, a battery 1030, PV cells 1040, a pump 1050, and a housing 1100. The water disinfection system 1010 is generally sized to be a portable system, but may come in various sizes.

As illustrated in FIG. 8, in one embodiment, the housing 1100 is a generally spherical housing, but it is understood that the housing 1100 may be a variety of different shapes and sizes. The housing 1100 has a housing inlet 1110 and a housing outlet 1120, to allow for water flow into and out of the housing 100. The housing may have a weighted ballast 1130 and feet 1132, which serve for positioning and to prevent the housing 1100 from tipping over. The PV cells 1040 are secured to the outside of the housing 1100 where they will be exposed to the most sunlight, as illustrated by FIGS. 8 and 9. The PV cells 1040, in one embodiment are covered by an acrylic shell 1042 that provide the PV cells 1040 with protection from the elements, as well as from damage inflicted by users of the water disinfection system 1010.

Secured within the housing 1100 is the battery 1030. The battery 1030 is operatively connected to a solar regulator 1031 and inverter 1032, which are operatively coupled to the PV cells 1040 that are located on the surface of the housing 1100. The solar regulator 1031 prevents overloading of the storage batteries by bleeding off power from the PV cells 1040 when the battery 1030 is already charged to capacity. Components of the system requiring alternating current (AC) for power will rely on the inverter 1032, which converts the direct current (DC) from PV cells 1040 into alternating current (AC). The battery 1030 is operatively coupled to the UV lamp generator 1021 and a pump motor 1051, in order to supply the power for the UV light 1020 and pump 1050.

The UV light 1020 is also secured within the housing 1100. As illustrated in FIG. 10, the UV light 1020 has coils 1022 wrapped around a sleeve 1024 having a sleeve inlet 1026 and sleeve outlet 1028 and a channel 1025 formed within the sleeve 1024 between the sleeve inlet 1026 and sleeve outlet 1028. The UV light 1020, in some embodiments is a coiled pulsating UV-C light, which maximizes the disinfection power with the least expenditure of energy. The coils 1022 are operatively coupled to and powered by the UV lamp generator 1021. The sleeve inlet 1026 has a water-tight seal with the housing inlet 1110 of the housing 1100. The sleeve outlet 1028 has a water-tight seal with the housing outlet 1120 of the housing 1100. The water-tight seals prevent liquid from entering the housing 1100 and damaging the components within the housing 1100. In one embodiment of the invention, the sleeve 1024 is made of quartz, which is more opaque to 185 nm light than 264 nm light. Therefore, since most lamps are made with quartz, the 264 nm light is better suited for the water disinfection system 1010. However, multiple wavelengths of UV light will work to disinfect water in the water disinfection system 1010.

In some embodiments of the invention, the UV light 1020 is covered in a reflective casing 1029 to protect the other components located in the housing 1100 from UV light damage. If the components in the housing 1100 are exposed to the UV light, they could suffer degradation of the materials and ultimately failure of the components. The reflective casing 1029 will also work to direct the majority of the light into the channel 1025 within the sleeve 1024, and keep it there for maximum disinfection of the water passing through the channel 1025.

As illustrated in FIG. 8, the pump 1050 is operatively coupled to the pump motor 1051. In other embodiments of the invention, the pump 1050 and associated pump motor 1051 are a single component. The pump 1050, in some embodiments is located near the sleeve inlet 1026 of the sleeve 1024 to facilitate pumping water into the channel 1025. Screens 1112 and 1114, in some embodiments are positioned on both sides of the pump 1050 to prevent debris from entering the channel 1025. In some embodiments, a baffle 1122 is located near the sleeve outlet 1028, which slows down the flow of water in the channel 1025, as well as protects the pump from backflow debris.

As illustrated in FIG. 8, the housing 1100, in some embodiments, has a low level probe 1150 with a water contact point 1152 that is located within the channel 1025. The probe 1150 will serve as the on switch for the UV light 1020 and pump 1030 when the water contact point 1152 detects the presence of water in the channel 1025, and the off switch when the water contact point 1152 does not detect the presence of water. The probe 1150, in some embodiments, includes a collimated beam 1154, which detects the turbidity of the water. If the collimated beam 1154 detects too many suspended particles in the water, then the probe 1150 will send a signal to prevent the water disinfection system 1010 from turning on.

As illustrated in the top view in FIG. 9, in one embodiment of the invention, the housing 1100 has a Light Emitting Diode ("LED") display 1160. The display may consist of a green LED 1162 and a red LED 1164. When the device is out of water an illuminated green light indicates that the water disinfection system 1010 is charged. When the device is in water, as illustrated in FIG. 11, the green light indicates that the system has finished disinfecting the water. A flashing red light indicates that the collimated beam 1154 detects that the water has too many particulates in it to disinfect the water. A solid red light when the device is out of the water indicates that the water disinfection system 1010 is not charged, while a solid red light when the device in submerged in water, as illustrated in FIG. 11, indicates that the disinfection is not complete. No light indicates that there is a faulty component somewhere in the water disinfection system 1010.

In one embodiment of the invention, the water disinfection system 1010 is set to run for a specified amount of time. The volume of water treated requires a certain UV dose to achieve disinfection. Factors such as flow rate, volume of water to be treated, intensity, retention time, as well as other factors will all be considered in determining the amount of time to run the water disinfection system 1010. Through testing and system analysis the UV dose required to disinfect a volume of water is determined. The water disinfection system 1010 is designed to operate according to tested parameters in order to deliver the desired disinfection UV dose. Since the water disinfection system 1010 is different sizes to accommodate different sized components for different volumes of water, the UV dose varies and the time to operate the water disinfection system 1010 is set to achieve the standards necessary for disinfection of the water. In other embodiments of the invention, a sensor is included in the water disinfection system to test the water as it is being disinfected. The water disinfection system 1010, in some embodiments, is programmed to turn off when the sensor detects a specified level of disinfected water, for example the system may turn off when the level of bacteria left in the water reaches a predetermined level.

In other embodiments of the invention, the housing 1100 has a master on/off switch 1166 to control the power manually, as illustrated in FIG. 9. In another embodiment of the invention, the housing 1100 has an attached handle 1170 for easily transporting the water disinfection system 1010, as illustrated in FIG. 9. As illustrated in FIGS. 8 and 11, in some embodiments of the invention, the water disinfection system 1010 has an eyelet 1180 to facilitate removing it from the container of water that it is disinfecting.

The water disinfection system 1010 is utilized in remote areas where water is retrieved directly from ponds, rivers, lakes, and other bodies of water that contain tens of millions of pathogenic bacteria, viruses, or parasites. A typical scenario in which the water disinfection system 1010 is used is when a villager brings a bucket of water up from a contaminated riverbed for use by the villager's family. The villager pours the water through a sand filter or cloth, which is typical in most remote areas, to strain out the sediment or debris. However, the villager unknowingly allows tens of millions of dangerous and deadly microorganisms through the makeshift filter. The villager then places the water disinfection system 1010 that has been fully charged by the sun, as indicated by the illuminated green LED 1162, into the container 1400, as illustrated in FIG. 11. Upon contact with the water, the water contact point 1152 signals the probe 1150 to turn on the pump 1050 and UV light 1020. The LED display 1160 will show a solid red LED 1164 indicating that the water disinfection system 1010 is circulating the water through the sleeve inlet 1026, through the screens 1112, 1114 and baffle 1122, and out the sleeve outlet 1028. The UV light 1020 destroys the vast majority of the microorganisms in a matter of minutes. When the green LED 1162 is illuminated, indicating that sterilization is complete, the villager loops a stick or metal pole 1410 through the eyelet 1180 of the water disinfection system 1010, so as to not contaminate the newly purified water, and removes it from the container 1400, as illustrated in FIG. 11. Upon loss of contact with the water, the water contact point 1152 sends a signal to the probe 1150 to turn off the pump 1050 and the UV light 1020. The villager rinses the device and places it back into the sun if the LED display 1160 illuminates a red LED 1164 indicating that the water disinfection system 1010 needs to be recharged. The disinfected water may now by consumed by the villager's family safely without fear of ingesting potentially fatal bacteria, viruses, or parasites.

The water disinfection system 1010 is an important and effective source of portable UV light used to disinfect various quantities of water. It may be sized based on the size of the containers of water to be disinfected, such as but not limited to, 1-5 gallons, 6-10 gallons, or 11-30 gallons. It can be used and distributed throughout the world as a single device to minimize diarrheal illness and save millions of lives. In other embodiments of the invention the water disinfection system 1010 may work in conjunction with other devices, including a power source carrier 1200.

As illustrated in FIG. 12, the power source carrier 1200 is an accessory PV device that provides additional power to the water disinfection system 1010, which translates to increased frequency of use of the system between charges. The carrier 1200 contains PV cells 1210, an additional battery 1220, a ballast 1230, a solar regulator 1240, a solar inverter 1250, a filtration lid 1260, a handle 1270, a master on/off switch 1280, and contact sensors 1290.

The carrier 1200 has PV cells 1210 located on its outer surface. The carrier 1200 is larger than the water disinfection system 1010, and thus, has PV cells over most of its body, allowing for more frequent charging and longer lasting charges, which results in more water disinfection cycles. The PV cells 1210 are operatively coupled to a carrier battery 1220 through a solar regulator 1240 and inverter 1250. As is the case with the inverter 1032 and regulator 1031 in the water disinfection system 1010, the inverter 1250 in the carrier 1200 converts the solar energy from the sun into battery power, and the regulator 1240 prevents the battery 1220 from being overcharged. The PV cells 1210 charge the larger carrier battery 1220 located in the base of the carrier 1200. The carrier battery 1220 powers the water disinfection system 1010 when it is connected to the carrier 1200. The larger carrier battery 1220 allows for more frequent use of the water disinfection system 1010 between full charges than using the water disinfection system 1010 alone.

The base of the carrier 1200 will house the ballast 1230 and contact sensors 1290. The ballast 1230 will locate and secure the carrier 1200 in the proper orientation and help prevent it from tipping over. The contact sensors 1290 are electrical interfaces for the connection between the water disinfection system 1010 and the carrier 1200. The water disinfection system 1010 and carrier 1200 work together to provide water more efficiently, than if the water disinfection system 1010 is used alone, since the carrier 1200 may store more power, allowing the water disinfection system 1010 to disinfect water more frequently. In one embodiment of the invention, the water disinfection system 1010 is secured to the contact sensors 1290 of the carrier 1200 through a water resistant connection in the feet 1132 of the water disinfection system 1010. The contact sensors 1290 operatively couple the water disinfection system 1010 to the carrier 1200. Thus, the controls of the carrier 1200 will also control the operation of the water disinfection system 1010. In other embodiments of the invention, the water disinfection system 1010 may be operatively connected to the carrier through other means that are known in the art.

The filtration lid 1260 is secured to the carrier 1200 through the lid lock 1266. The filtration lid 1260, in some embodiments has a small window 1264 through which the LED display 1160 is observed when the lid is secured to the carrier 1200. The filtration lid 1260, in other embodiments contains a solid cover 1262. The filtration lid 1260 removes debris from water poured into the carrier, while the solid cover 1262 secures the water inside of the carrier 1200 from the outside elements when the filtration lid 1260 is not in use. As illustrated in FIG. 13, a window 1264 is provided in the filtration lid 1260 in order to view the LED display from outside of the carrier 1200. This gives the user the ability to check the status of the power of the water disinfection system 1010 or the status of the disinfection cycle.

In other embodiments of the invention, the carrier 1200 may also have a power cord attachment 1300 with a water proof cover 1310. An accessory cord is inserted into the carrier 1200 at the power cord attachment 1300 to charge the carrier 1200 alone, or charge the carrier 1200 in combination with the water disinfection system 1010 (when attached). In other embodiments, the power cord attachment 1300 also acts as a data cord to analyze information about the water disinfection system 1010 and carrier 1200.

The water disinfection system 1010 and the carrier 1200 are used by placing the water disinfection system 1010 into the carrier 1200, while making sure the feet 1132 are secured to the contact sensor 1290. The green LED 1162 will flash when the two are attached properly. While the carrier is in the sun, the PV cells 1210 of the carrier 1200 absorb the sun's energy. The inverter 1250 converts that energy into energy that is stored in the carrier battery 1220. The carrier battery 1220 is charged until the capacity of the carrier battery 1220 is full, at which point in time the regulator 1240 will bleed off the power generated by the PV cells 1210 to protect the carrier battery 1220 from damage due to overcharging. At the same time, the carrier battery 1220 is being charged through the PV cells 1210, it charges the water disinfection system's 1010 battery 1030 through the contact sensors 1290.

To turn the water disinfection system 1010 and carrier 1200 on a user switches the master on/off switch 1280 to on. However, if there is no water in the carrier 1200, the water disinfection system 1010 will not turn on because the water contact point 1152 would not detect the presence of water. A user may pour water through the closed filtration lid 1260 and into the carrier 1200 containing the installed water disinfection system 1010. The filtration lid 1260 removes any large particles from the water being poured into the carrier 1200. As previously discussed, upon contact with water, the water disinfection system's 1010 red LED 1164 is illuminated, and the pump and UV light 1020 are activated. In another embodiment of the invention, the carrier 1200 has a separate circulating pump or fan to help circulate the water located in the carrier 1200. In this embodiment, the circulating pump or fan within the carrier 1200 is activated when the water disinfection system 1010 is activated, and will begin to initiate water flow through the water disinfection system 1010. After the water disinfection system 1010 is activated, a user of the system may look through the window 1264 in the filtration lid 1260 to view the LED display 1160. When the LED display 1160 changes from the red LED 1164 to the green LED 1162, the disinfection is complete. The water is then poured directly from the carrier 1200 into a clean container using the handle 1270.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A water disinfection system for disinfecting water, the water disinfection system comprising:
   a housing, wherein the housing comprises a housing inlet and a housing outlet such that, excluding the housing inlet and the housing outlet, the housing is watertight;
   a charge controller connected to the housing;
   a battery connected to the housing and operatively coupled to the charge controller;
   a connecter operatively coupled to the charge controller and configured for coupling to an external power source;
   an inverter connected to the housing and operatively coupled to the charge controller;
   an ultraviolet light connected to the housing and operatively coupled to the inverter;
   a pump connected to the housing and operatively coupled to the inverter; and
   wherein the housing is substantially submergible within water inside a container, wherein the housing inlet is submergible within the water inside the container, and wherein the pump cycles the water inside of the container through the housing for disinfecting the water within the container using the ultraviolet light.

2. The water disinfection system of claim 1, wherein the external power source is solar power cells or a AC power supply.

3. The water disinfection system of claim 1, wherein the housing inlet is operatively coupled to the pump, wherein the housing inlet is configured for being located a distance off of a floor of the container, such that the distance off of the floor reduces debris from the floor of the container entering the housing through the housing inlet; and
   wherein the exit is operatively coupled to an ultraviolet light housing, wherein the ultraviolet light housing forms a cavity at least partially encasing the ultraviolet light, wherein the ultraviolet light housing is operatively coupled to the pump.

4. The water disinfection system of claim 1, further comprising:
   a handle connected to the housing for installing and removing the water disinfection system from a container of water.

5. The water disinfection system of claim 1, further comprising:
   a securing device connected to the housing for connecting the water disinfection system to a container or other structure.

6. The water disinfection system of claim 1, further comprising:
   at least one switch connected to the housing and operatively coupled to the water disinfection system, for controlling charging of the battery and operation of the water disinfection system.

7. The water disinfection system of claim 1, further comprising:
   a timer connected to the housing and operatively coupled to the water disinfection system.

8. The water disinfection system of claim 1, further comprising:
   operating indicator displays connected to the housing and operatively coupled to the water disinfection system for illustrating the battery status, if a fault is detected in the system, and if the power is on.

9. The water disinfection system of claim 1, further comprising the container, wherein the container is a storage container, and wherein the storage container comprises:
   a storage housing;
   a lid connected to the storage housing; and
   wherein the water disinfection system is at least partially submerged in water inside the storage housing.

10. A water disinfection system for disinfecting water, the water disinfection system comprising:
- a housing, wherein the housing comprises a housing inlet and a housing outlet, and wherein the housing is watertight;
- a pump operatively coupled to the housing and at least one power source for cycling the water though the housing;
- an ultraviolet light operatively coupled to the housing and the at least one power source for disinfecting the cycled water; and
- wherein the housing is substantially submergible within water inside a container, wherein the housing inlet is submergible within the water inside the container, and wherein the pump cycles the water inside of the container through the housing inlet and out of the housing outlet for disinfecting the water within the container using the ultraviolet light.

11. The water disinfection system of claim 10, wherein the at least one power source is a battery.

12. The water disinfection system of claim 10, wherein the at least one power source is a solar power cell.

13. The water disinfection system of claim 10, wherein the at least one power source is a AC power supply.

14. The water disinfection system of claim 10, further comprising:
- a charge controller operatively coupled to the housing and the at least one power source for regulating power from the at least one power source.

15. The water disinfection system of claim 10, further comprising:
- an inverter operatively coupled to the housing and the at least one power source for converting the current from the at least one power source.

16. The water disinfection system of claim 10, wherein the at least one power source is operatively coupled to the housing.

17. The water disinfection system of claim 10, further comprising:
- a connector operatively coupled to the at least one power source and the water disinfection system.

18. The water disinfection system of claim 10, wherein the housing inlet is located in the housing such that when the housing is substantially submergible within the container the housing inlet is located a distance off of a floor of the housing to reduce debris from the floor entering the housing inlet, and wherein the water is cycled into the housing inlet, through the housing, and out of the housing outlet.

19. The water disinfection system of claim 10, further comprising:
- a handle for installing and removing the water disinfection system from a container of water.

20. The water disinfection system of claim 10, further comprising:
- a securing device operatively coupled to the housing for connecting the water disinfection system to a container or other structure.

21. The water disinfection system of claim 10, further comprising:
- at least one switch operatively coupled to the housing and the water disinfection system, for controlling the operation of the water disinfection system.

22. The water disinfection system of claim 10, further comprising:
- a timer operatively coupled to the housing and the water disinfection system.

23. The water disinfection system of claim 10, further comprising:
- operating indicator displays operatively coupled to the housing and the water disinfection system illustrating the operation of the system.

24. The water disinfection system of claim 10, further comprising the container, wherein the container is a storage container, and wherein the storage container comprises:
- a storage housing;
- a lid operatively coupled to the storage housing; and
- wherein the water disinfection system is at least partially submerged in water inside the storage housing.

25. A water disinfection system for disinfecting water, the water disinfection system comprising:
- a housing, wherein the housing has a housing inlet and a housing outlet such that, excluding the housing inlet and the housing outlet, the housing is watertight;
- a charge controller operatively coupled within the housing;
- a battery operatively coupled to the charge controller within the housing;
- a connecter with a first end operatively coupled to the charge controller and a second end that is configured to be operatively coupled to an external power source;
- an inverter operatively coupled to the charge converter within the housing;
- an ultraviolet light housing operatively coupled to the housing, wherein the ultraviolet light housing comprises:
  - an ultraviolet housing cavity; and
  - an ultraviolet bulb operatively coupled to the ultraviolet light housing and the inverter;
- a pump operatively coupled to the housing and to the inverter, for pumping water from the housing inlet through the ultraviolet housing cavity and out the housing outlet; and
- wherein the housing is substantially submergible within water inside a container, wherein the housing inlet is submergible within the water inside the container, and wherein the pump cycles the water inside of the container through the housing for disinfecting the water within the container using the ultraviolet bulb.

26. The water disinfection system of claim 25, wherein the housing comprises a dry chamber and a wet chamber; wherein the charge controller, battery, and inverter are operatively coupled to the dry chamber; and wherein the ultraviolet light housing and the pump are operatively coupled to the wet chamber.

27. The water disinfection system of claim 25, wherein the external power source is solar power cells or a AC power supply.

28. The water disinfection system of claim 25, wherein the water disinfection system comprises:
- a handle operatively connected to the housing for installing and removing the water disinfection system from a container of water.

29. The water disinfection system of claim 25, further comprising:
- a securing device operatively coupled to the housing for operatively coupling the water disinfection system to a container or other structure.

30. The water disinfection system of claim 25, further comprising:
- at least one switch operatively coupled to the housing and to the water disinfection system, for operating the water disinfection system.

31. The water disinfection system of claim 25, further comprising:
- a timer operatively coupled to the housing and to the water disinfection system, for indicating the amount of time the water disinfection system should operate.

32. The water disinfection system of claim 25, further comprising:
operating indicator displays operatively coupled to the housing and to the water disinfection system for illustrating the battery status, if a fault is detected in the system, and if the power is on.

33. The water disinfection system of claim 25, further comprising the container, wherein the container is a storage container, and wherein the storage container comprises:
a storage housing;
a lid operatively coupled to the storage housing; and
wherein the water disinfection system is at least partially submerged under water inside the storage housing.

34. A water disinfection system for disinfecting water, the water disinfection system comprising:
a housing, wherein the housing is waterproof and comprises a dry chamber and a wet chamber with a housing outlet and a housing inlet such that, excluding the housing inlet and the housing outlet, the housing is watertight;
a charge controller connected to the dry chamber of the housing;
a battery connected to the dry chamber of the housing and operatively coupled to the charge controller;
a waterproof connecter with a first end operatively coupled to the charge controller through a waterproof opening in the dry chamber of the housing and a second end that is configured to be operatively coupled to an external power source, wherein the external power source comprises solar power cells or an inverter cable that is configured to operate with an AC power supply;
an inverter connected to the dry chamber of the housing and operatively coupled to the charge converter;
an ultraviolet light housing connected to the wet chamber of the housing, wherein the ultraviolet light housing comprises:
an ultraviolet housing inlet leading to an ultraviolet housing cavity leading to an ultraviolet housing outlet, wherein the ultraviolet housing outlet is connected to the housing outlet though a waterproof seal; and
an ultraviolet bulb connected within the ultraviolet housing cavity, wherein the ultraviolet bulb is operatively coupled to the inverter with a wire though a waterproof opening between the wet chamber and the dry chamber;
a pump connected to the wet chamber of the housing, for pumping water through the ultraviolet light housing, wherein the pump comprises:
a pump inlet and a pump outlet, wherein the pump outlet is connected to the ultraviolet housing inlet through a waterproof seal and the pump inlet is connected to the housing inlet through a waterproof seal, and wherein the pump is operatively coupled to the inverter with a wire through a waterproof opening between the wet chamber and the dry chamber; and
wherein the housing is substantially submergible within water inside a container, wherein the housing inlet is submergible within the water inside the container, and wherein the pump cycles the water inside of the container through the housing for disinfecting the water within the container using the ultraviolet bulb.

35. The water disinfection system of claim 34, further comprising:
a battery switch operatively coupled to the charge controller;
a connector switch operatively coupled to the charge controller;
a timer operatively coupled to the battery;
operating indicator displays illustrating the battery status, if the battery is charging, a fault is detected in the system, the power is on, and the ultraviolet bulb is functioning properly; and
wherein the battery switch, the connector switch, the timer, and at least one of the operating indicator displays are located on one or more panels that are connected to the housing.

36. The water disinfection system of claim 34, further comprising:
a handle connected to the housing; and
an eyelet connected to the handle or the housing.

37. The water disinfection system of claim 34, further comprising the container, wherein the container is a storage container, wherein the water disinfection system is operatively coupled to the storage container, and wherein the storage container comprises:
a storage housing;
a lid with a through hole opening having screens, wherein the lid is connected to the storage housing; and
wherein water is filtered through the screens for removing debris from the water.

38. The water disinfection system of claim 37, further comprising:
a removable lock and cable system connected to the storage housing, wherein the cable is thread through an eyelet and locked to the storage housing;
a seating ring connected to the storage housing, wherein the seating ring provides a stable surface to position and connect the water disinfection system in the storage housing;
a spout connected to the storage housing for accessing the disinfected water without contaminating the disinfected water; and
at least one water line illustrating the ideal level of water to disinfect.

* * * * *